(12) United States Patent
Mochizuki (10) Patent No.: US 10,722,975 B2
(45) Date of Patent: Jul. 28, 2020

(54) LASER PROCESSING DEVICE CAPABLE OF STARTING LASER PROCESSING WHILE REDUCING REFLECTED LASER BEAM

(71) Applicant: FANUC CORPORATION, Yamanashi (JP)

(72) Inventor: Tatsuya Mochizuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 590 days.

(21) Appl. No.: 15/443,292

(22) Filed: Feb. 27, 2017

(65) Prior Publication Data

US 2017/0246708 A1   Aug. 31, 2017

(30) Foreign Application Priority Data

Feb. 29, 2016 (JP) ................. 2016-038075

(51) Int. Cl.
*B23K 26/046* (2014.01)
*B23K 26/60* (2014.01)
*B23K 26/03* (2006.01)
*B23K 103/04* (2006.01)
*B23K 103/10* (2006.01)

(52) U.S. Cl.
CPC ............ *B23K 26/046* (2013.01); *B23K 26/03* (2013.01); *B23K 26/032* (2013.01); *B23K 26/60* (2015.10); *B23K 2103/04* (2018.08); *B23K 2103/10* (2018.08)

(58) Field of Classification Search
CPC ........... G05B 2219/45135; G05B 2219/45041; B23K 26/03; B23K 26/032; B23K 26/046; B23K 26/60; B23K 2103/04; B23K 2103/10

USPC ...................................................... 219/121.62
See application file for complete search history.

(56) References Cited

U.S. PATENT DOCUMENTS

| 6,694,614 | B2 |   | 2/2004  | Ukita et al. |
| 8,890,028 | B2 | * | 11/2014 | Mori ...................... B23K 26/00 219/121.83 |
| 9,067,281 | B2 | * | 6/2015  | Beutler .............. B23K 26/0876 |
| 9,463,529 | B2 |   | 10/2016 | Miyamoto et al. |
| 9,520,693 | B2 |   | 12/2016 | Matsumoto |
| 2010/0093112 | A1 | * | 4/2010 | Takagi .................. B23K 26/03 438/7 |

(Continued)

FOREIGN PATENT DOCUMENTS

| CN | 1326837 A   | 12/2001 |
| CN | 103153522 A | 6/2013  |

(Continued)

*Primary Examiner* — Dana Ross
*Assistant Examiner* — Joe E Mills, Jr.
(74) *Attorney, Agent, or Firm* — RatnerPrestia (57) ABSTRACT

A laser processing device for efficiently starting laser processing, while eliminating an adverse effect due to a reflected laser beam from a workpiece. The laser processing device detects an intensity of a reflected beam, which is a part of a laser beam irradiated from a laser oscillator and then is reflected by a workpiece surface, continuously increases an intensity of the irradiating laser beam over a predetermined period of time, selects a content of a next process, based on a temporal change in the intensity of the detected reflected beam, and executes the next process subsequent to the laser processing, based on the selected content of the next process.

12 Claims, 8 Drawing Sheets

(56) References Cited

U.S. PATENT DOCUMENTS

2017/0220927 A1    8/2017    Takigawa et al.

FOREIGN PATENT DOCUMENTS

| CN | 103372720 | A  | 10/2013 |
| CN | 105312777 | A  | 2/2016 |
| DE | 102017101223 | A1 | 8/2017 |
| JP | S62-289387 | A  | 12/1987 |
| JP | H02179376 | A  | 7/1990 |
| JP | 2706498 | B  | 1/1998 |
| JP | 2004058141 | A  | 2/2004 |
| JP | 2004082131 | A  | 3/2004 |
| JP | 2006082120 | A  | 3/2006 |
| JP | 2007029989 | A  | 2/2007 |
| JP | 2007039716 | A  | 2/2007 |
| JP | 2008068288 | A  | 3/2008 |
| JP | 2012-076088 | A  | 4/2012 |
| JP | 2014034034 | A  | 2/2014 |
| WO | 2012157355 | A1 | 11/2012 |

* cited by examiner

LASER PROCESSING DEVICE CAPABLE OF STARTING LASER PROCESSING WHILE REDUCING REFLECTED LASER BEAM

BACKGROUND OF THE INVENTION

1. Field of the Invention

The present invention relates to a laser processing device having a function for starting laser processing of an object to be processed, while reducing a reflected laser beam from the object.

2. Description of the Related Art

In some prior art techniques, when laser processing is carried out by irradiating a laser beam onto an object (or a workpiece) such as a metal material to be processed, a reflected laser beam from the workpiece is used to improve welding quality. For example, JP 2706498 B discloses a laser processing device including: a reflected beam detection means for detecting a level of a laser beam reflected by a workpiece surface and returned into a laser oscillator; a sense means for sensing that the level of the reflected beam falls below a predetermined threshold; and a command means for starting a piercing process by irradiating a laser beam at a required output level, terminating the piercing process when the level of the reflected beam falls below the threshold, and subsequently outputting a command for the next piercing process.

JP 2012-076088 A discloses a method, in which, prior to a laser cutting process of a plate-like workpiece, piercing processing is carried out multiple times by variously changing an approach position of a light condensing lens relative to a workpiece so as to variously change a focal position for the workpiece, and then a laser cutting process of the workpiece is carried out while maintaining the focal position where a detection value of an amount of scattering light detected in the multiple times of piercing is minimum.

If an object to be processed is a metal material such as steel or aluminum, which easily reflects a laser beam, at the moment when a laser beam is irradiated onto the workpiece, a part of the irradiated laser beam is reflected so as to reversely progress along a path similar to the outward path, and then the part of the laser beam is returned to a laser oscillator as the reflected beam, whereby the laser oscillator or a beam path may be damaged. As such, due to the reflected laser beam returned to the laser oscillator, the laser power cannot be controlled and/or the optical system may be damaged. As a relevant prior art document for avoiding such a problem, JP S62-289387 A discloses a technique to incline at least one of an irradiation head and a reflecting material, so that an optical axis of an irradiating laser beam is not aligned with an optical axis of a reflected laser beam.

As described above, in case that the object to be processed is a metal material such as steel or aluminum, by which the laser beam is easily to be reflected, or that an energy density at a processing point is relatively low, when a light condensing point is positioned on a surface of the object, the part of the irradiated laser beam may reversely progress along the path similar to the outward path so as to be returned to the laser oscillator as the reflected beam. As the amount (or intensity) of the reflected beam is high, the laser light source or the beam path of the laser processing device may be increased. In the prior art, in order to avoid the excess reflected beam, it is necessary to irradiate the laser beam onto the surface of the object at a tentative processing condition, and then change (or optimize) the processing condition so as to reduce the intensity of the reflected beam, when the intensity of the reflected beam is high enough to create an adverse effect.

Although the technique of JP 2706498 B or JP 2012-076088 A is intended to detect the reflected beam (or the scattering light), the technique is not intended to reduce or eliminate the adverse effect of the reflected beam on the laser light source, etc. On the other hand, in JP S62-289387 A, at least one of the irradiation head and the reflecting material is inclined so as to avoid the adverse effect of the reflected beam. However, when the laser beam is obliquely irradiated to the surface of the object, the quality of the laser processing may be deteriorated, compared to a case in which the laser beam is generally vertically irradiated to the object. Otherwise, in the configuration of JP S62-289387 A, it is necessary to arrange a means for arbitrarily change an angle of the object relative to the laser beam, in order to vertically irradiate the laser beam onto the object.

SUMMARY OF THE INVENTION

An object of the present invention is to provide a laser processing device having a function for efficiently starting laser processing, while eliminating an adverse effect due to a reflected laser beam from an object to be processed.

Accordingly, one aspect of the present invention provides a laser processing device for carrying out laser processing of an object to be processed by condensing a laser beam by a light condense optical system and irradiating the laser beam onto the object, the laser processing device comprising: a reflected beam intensity detecting part configured to detect an intensity of a reflected beam, which is a part of a laser beam irradiated from a laser oscillator via a laser optical system and then is reflected by a surface of the object so as to return to the laser oscillator or the laser optical system; a light condense optical system configured to condense the laser beam irradiated from the laser oscillator; a beam intensity increasing part configured to continuously increase an intensity of the laser beam irradiated onto the surface of the object, over a predetermined period of time; a next process selecting part configured to select a content of a next process, based on a temporal change in the intensity of the reflected beam detected by the reflected beam intensity detecting part, during the intensity of the laser beam irradiated onto the surface of the object is increased; and an executing part configured to execute the next process subsequent to the laser processing, based on the content of the next process selected by the next process selecting part.

In a preferred embodiment, the beam intensity increasing part is configured to change a distance between a light condensing point of the light condense optical system and the object. Otherwise, the beam intensity increasing part may be configured to change a beam diameter of the laser beam entering the light condense optical system.

In a preferred embodiment, the content of the next process selected by the next process selecting part includes one of: continuing the laser processing; stopping the laser irradiation or suspending a processing program; and executing retry operation.

The laser processing device may further comprise a means for setting an increase rate of the intensity of the laser beam irradiated onto the surface of the object, and/or a means for changing a period of time from when the intensity of the reflected beam turns downward to when a current process is transited to the next process selected by the next process selecting part.

In a preferred embodiment, the next process selecting part is configured to select continuing the laser processing as the next process, when the intensity of the reflected beam turns downward within the predetermined period of time.

It is preferable that the next process selecting part be configured to select stopping the laser irradiation or suspending the processing program as the next process, when the intensity of the reflected beam exceeds a predetermined first threshold.

Further, it is preferable that the next process selecting part be configured to select continuing the laser processing as the next process, when the intensity of the reflected beam does not turn downward and does not reach a second threshold lower than a predetermined first threshold within the predetermined period of time.

Further, it is preferable that the next process selecting part be configured to select executing the retry operation as the next process, when the intensity of the reflected beam does not turn downward and when the intensity of the reflected beam is lower than a predetermined first threshold and higher than a second threshold lower than the first threshold after the predetermined period of time has elapsed. In this case, the retry operation may be executed after a laser power is increased or after an increase rate of the intensity of the laser beam is increased.

In a preferred embodiment, a laser power which is output from the laser oscillator is maintained constant, during the intensity of the laser beam irradiated onto the surface of the object is increased.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
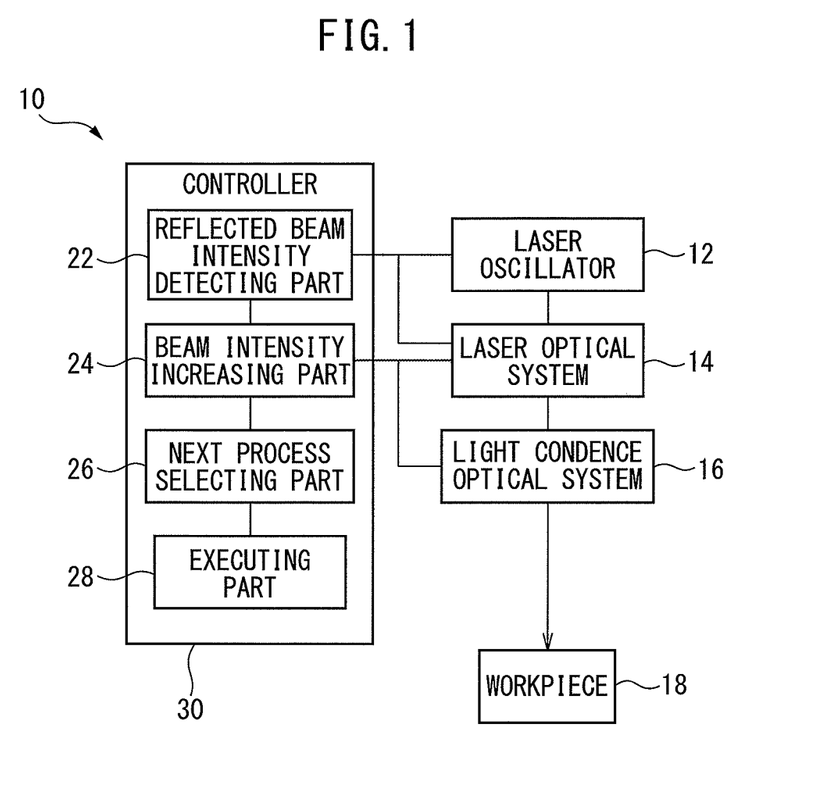
FIG. 1 is a functional block diagram of a laser processing device according to a preferred embodiment of the present invention.
Figure 2:
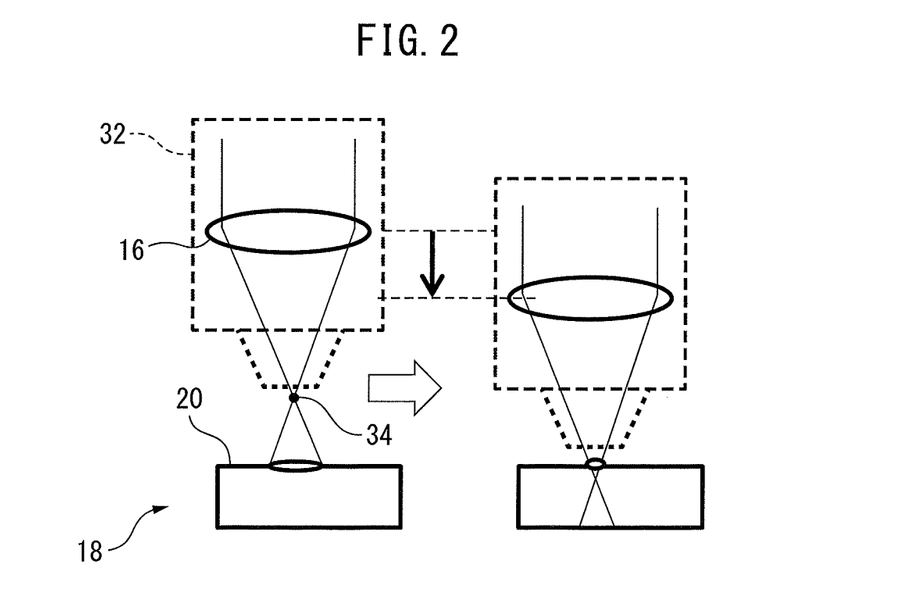
FIG. 2 shows an example in which a processing head including a light condense optical system is configured to be moved toward or away from a workpiece.
Figure 3:
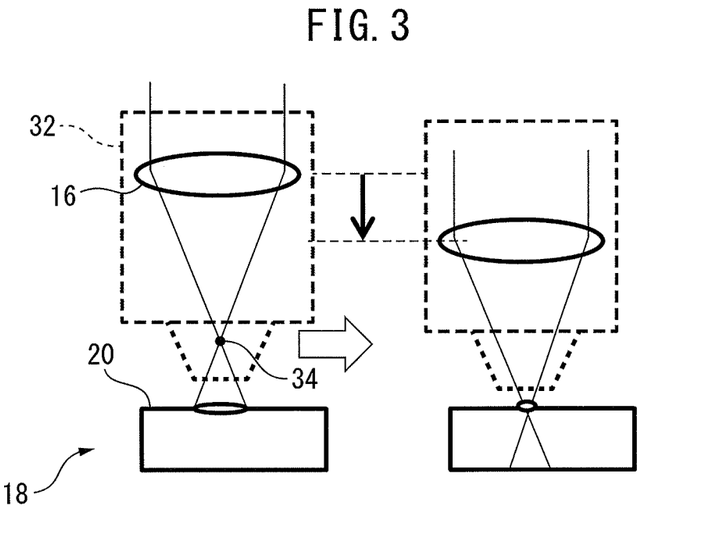
FIG. 3 shows an example in which a light condense optical system within a processing head including is configured to be moved toward or away from the workpiece.

FIG. 1 is a functional block diagram of a laser processing device 10 according to a preferred embodiment of the present invention. Laser processing device 10 is configured to carry out a predetermined laser processing such as cutting, welding, piercing or marking, by condensing a laser beam, which is output from a laser oscillator 12 via a laser optical system 14, by using a light condense optical system 16, and by (preferably, generally vertically) irradiating the laser beam onto a surface 20 of an object (or a workpiece 18) to be processed, as shown in FIGS. 2 and 3.

Laser processing device 10 has: a reflected beam intensity detecting part 22, such as an optical sensor, configured to detect (or monitor) an intensity of a reflected beam (or a reflected beam intensity), which is a part of a laser beam irradiated from laser oscillator 12 via laser optical system 14 and then is reflected by surface 20 of workpiece 18 so as to return to laser oscillator 12 or laser optical system 14; a beam intensity increasing part 24 configured to continuously or gradually increase an intensity of the laser beam irradiated onto workpiece surface 20, over a predetermined period of time; a next process selecting part 26 configured to select (or determine) a content of a next process, based on a temporal change in the intensity of the reflected beam detected by reflected beam intensity detecting part 22, during the laser beam intensity of the laser beam irradiated onto workpiece surface 20 is increased; and an executing part 28 configured to execute the next process subsequent to the laser processing, based on the content of the next process selected or determined by next process selecting part 26.

The motion of each component as shown in FIG. 1 may be automatically executed or controlled by (a processor of) a controller 30 configured to control the basic motion of laser processing device 10. Otherwise, the motion of each component may be automatically executed or controlled by another device (such as a personal computer) which is separated from controller 30. Also, the functions of laser processing device as described below (e.g., a means for setting an increase rate of the intensity of the laser beam, or a means for changing a period of time until the laser processing is transited to the next process) may be provided to (the processor of) controller 30, or another device (such as a personal computer) which is separated from controller 30.

Herein, the intensity of the reflected beam refers to the intensity per unit area of a laser beam reflected by the workpiece surface, or an intensity of a laser beam entering a sensor for detecting the reflected beam. On the other hand, the intensity of the laser beam irradiated onto the workpiece surface refers to the intensity per unit area of the laser beam progressing toward the workpiece surface, with respect to a plane perpendicular to an optical axis of the laser beam.

Figure 4:
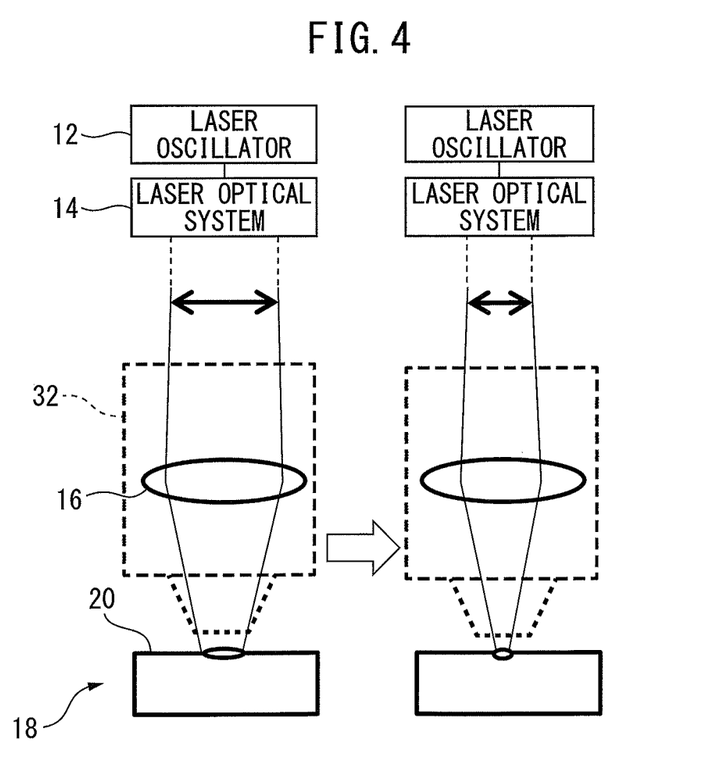
FIG. 4 shows an example in which a laser optical system can change a beam diameter.

FIGS. 2 to 4 show examples of a unit which may correspond to beam intensity increasing part 24. FIG. 2 exemplifies a configuration in which light condense optical system (or light condensing lens) 16 is fixed within a processing head 32, and processing head 32 is configured to be (vertically) moved toward or away from workpiece 18. By moving processing head 32 relative to workpiece 18 by using a drive axis, etc., the intensity (or the energy density) of the laser beam irradiated onto workpiece surface 20 can be gradually increased.

FIG. 3 exemplifies an alternative configuration of FIG. 2, in which light condense optical system (or light condensing lens) 16 is movably positioned within processing head 32, and light condense optical system 16 is configured to be (vertically) moved toward or away from workpiece 18. By moving light condense optical system 16 relative to workpiece 18 by using a drive axis, etc., the intensity (or the energy density) of the laser beam irradiated onto workpiece surface 20 can be gradually increased. In either configuration of FIG. 2 or FIG. 3, the distance between light condensing point 34 of light condense optical system 16 and workpiece surface 20 is variable.

FIG. 4 shows a means for changing a beam diameter of the laser beam entering light condense optical system (light condensing lens) 16. Concretely, by using laser optical system 14 as shown in FIG. 1, the beam diameter of the laser beam irradiated from laser oscillator 12 can be changed. For example, an AO (adaptive optics) mirror (having a variable curvature) may be used as laser optical system 14, and the beam diameter of the laser beam entering light condense optical system 16 can be changed by changing the curvature of the AO mirror. As a result, the intensity (or the energy density) of the laser beam irradiated onto workpiece surface 20 can be gradually increased.

Figure 5:
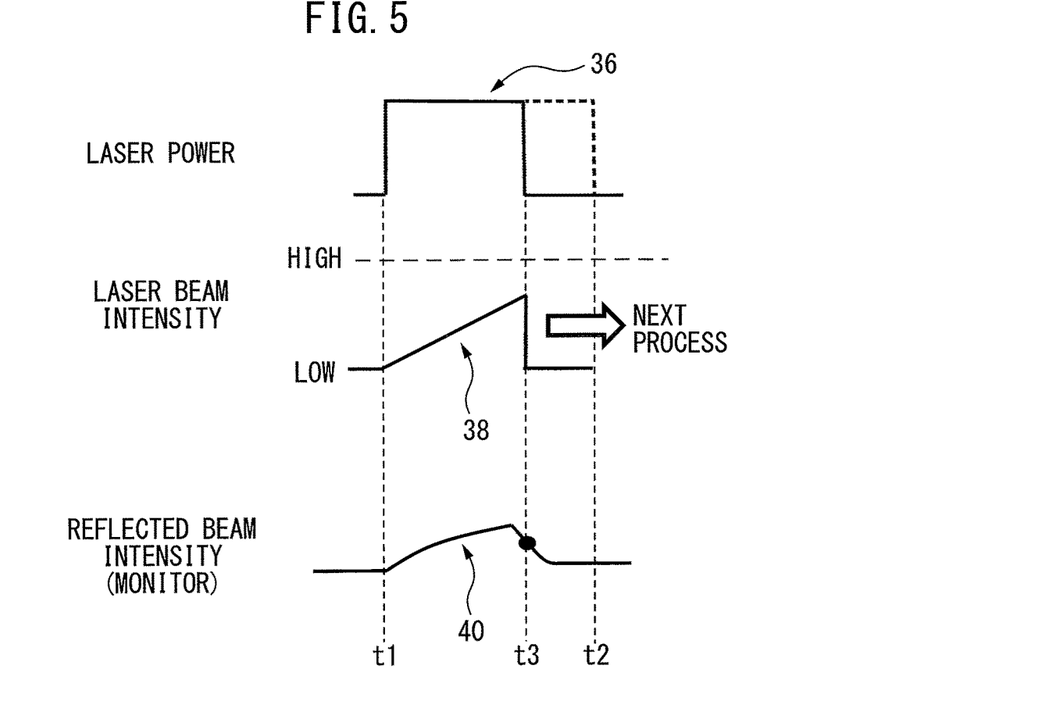
FIG. 5 is a graph exemplifying that an intensity of a reflected beam turns downward within a predetermined period of time.

FIG. 5 is a graph showing the laser power of laser processing device 10, the intensity of the laser beam irradiated onto workpiece surface 20, and the intensity of the reflected beam from workpiece surface 20, using the same time axis. When the laser beam is started to be output at time point t1 (graph 36), the beam intensity increasing part as exemplified in FIGS. 2 to 4 gradually increases the intensity of the laser beam irradiated onto workpiece surface 20 over a predetermined period of time (graph 38). At this point, the intensity of the reflected beam is also increased with increase in the intensity of the irradiating laser beam, and then, in many cases, a recess (or a crater) is formed on workpiece surface 20 by the laser beam absorbed by workpiece surface 20. Therefore, as indicated by graph 40, the intensity of the reflected beam (or the monitored intensity) turns downward.

In other words, when the decrease in the intensity of the reflected beam is detected, it can be judged that the recess is formed on workpiece surface 20. Further, after the recess is formed, workpiece surface 20 is likely to absorb the laser beam. Therefore, in the example of FIG. 5, it is not necessary to increase the intensity of the laser beam until time point t2. Instead, immediately after the intensity of the reflected beam turns downward (e.g., at time point t3), the laser power may be stopped and the current process may be transited to the next process (e.g., continuing the laser processing). In the next process, the laser processing can be executed at a high intensity of the laser beam, from the beginning of the process. In other words, the laser processing can be started while limiting the intensity of the reflected beam, without gradually increasing the intensity of the laser beam irradiated onto workpiece surface 20 (even when the laser beam at high intensity is suddenly irradiated onto the workpiece).

Figure 6:
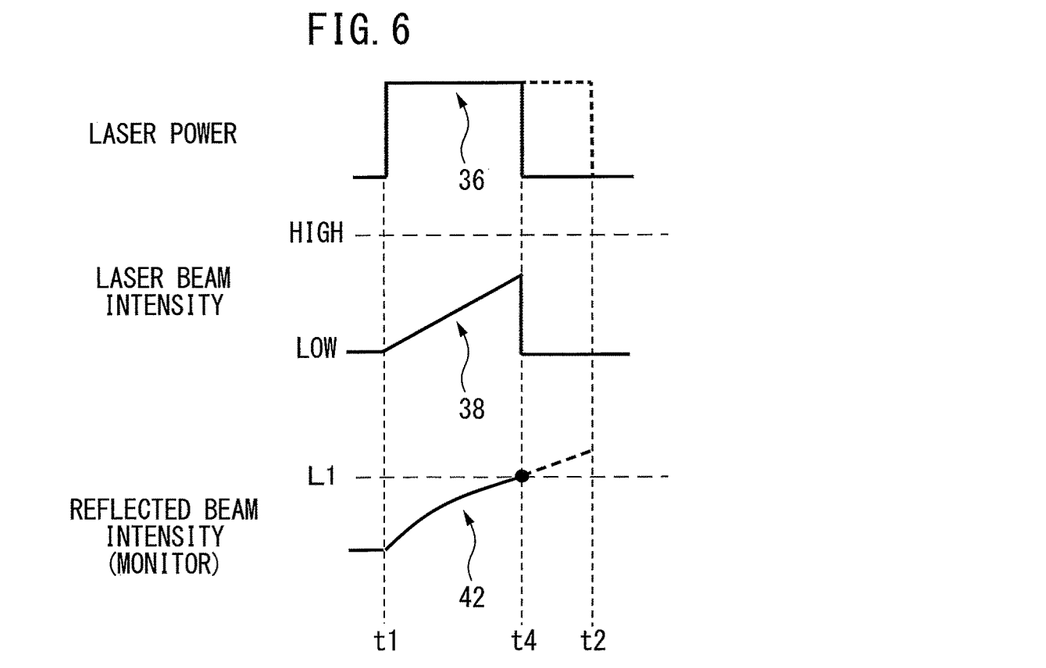
FIG. 6 is a graph exemplifying that an intensity of a reflected beam exceeds a first threshold without turning downward within the predetermined period of time.

FIG. 6 is a graph similar to FIG. 5, whereas the recess is not formed within the predetermined period of time (from t1 to t2). Concretely, FIG. 6 exemplifies that the laser beam is started to be output at time point t1 (graph 36), the intensity of the laser beam irradiated onto workpiece surface 20 is gradually increased over a predetermined period of time (graph 38), and the intensity of the reflected beam exceeds a predetermined first threshold L1 at time point t4, during the intensity of the laser beam is increased (graph 42). As described above, when the recess, etc., is not formed on the workpiece surface even by increasing the intensity of the laser beam and the intensity of the reflected beam exceeds first threshold L1, the laser oscillator etc., may be damaged or broken by the reflected beam, and thus it is preferable that the laser power be stopped in such a case. In this regard, first threshold L1 may be (for example, experimentally) set to a value corresponding to an intensity at which the laser oscillator, etc., may be damaged, or a value obtained by subtracting a margin from the intensity. Therefore, the next process in this case is stopping the laser irradiation or stopping the processing program regarding the laser processing.

In case that the workpiece is formed by a material having high reflectivity, a reflected beam having high intensity is generated at the moment when the laser beam is irradiated onto the workpiece, depending on the intensity of the laser beam, and then the laser oscillator, etc., may be damaged or broken by the reflected beam. In the example of FIG. 6, the laser power (or the laser oscillator) can be stopped immediately after the intensity of the reflected beam exceeds the first threshold, and thus malfunction or breakage of the laser oscillator, etc., due to the reflected beam can be assuredly avoided. In this regard, an alarm may be output when the intensity of the reflected beam exceeds first threshold L1, so that the operator can rapidly recognize that effect.

Figure 7:
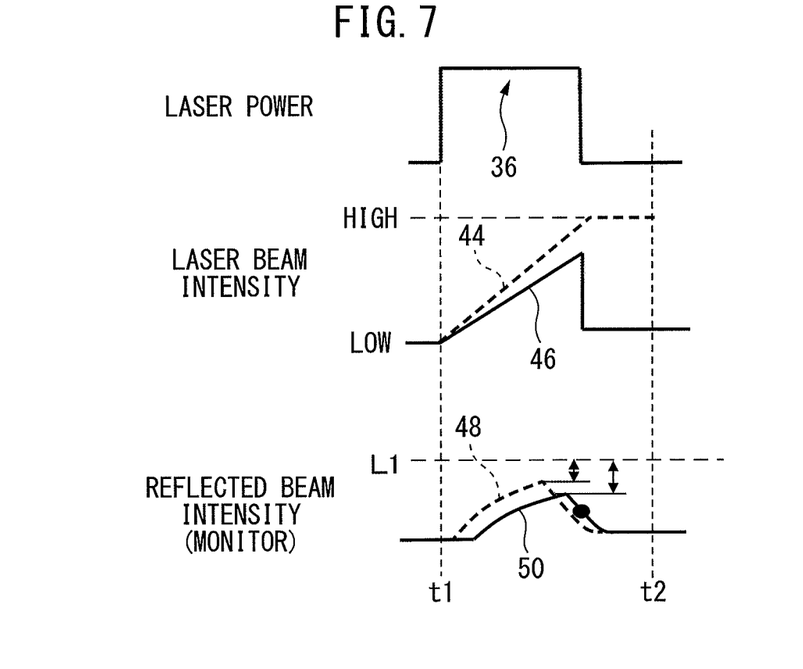
FIG. 7 is a graph, similar to FIG. 5, exemplifying that an increase rate of the intensity of the laser beam is varied.

FIG. 7 is a graph similar to FIG. 5, showing an example in which the increase rate of the intensity (or the energy density) of the laser beam is changed. Since the intensity of the reflected beam is also changed depending on the intensity of the irradiating laser beam, a margin can be added to the reflected beam by determining an optimum value of the laser beam. In the example of FIG. 7, when the intensity of the laser beam from time point t1 to time point t2 is changed from dashed-line graph 44 to solid-line graph 46, the intensity of the reflected beam is changed from dashed-line graph 48 to solid-line graph 50.

In general, the intensity of the reflected beam is fluctuated, and may be precipitously increased depending on the surface condition of the workpiece. Therefore, it is preferable that the intensity of the reflected beam be low as possible relative to first threshold L1 which is the criterion for outputting the alarm (or stopping the laser irradiation). Accordingly, by changing the increase rate of the intensity of the laser beam and determining the optimum condition so as to minimize the intensity of the reflected beam, the intensity of the reflected beam can be prevented from exceeding the first threshold even if the intensity of the reflected beam is fluctuated, whereby the current process can be assuredly transited to the next process (or the normal laser processing). In the example of FIG. 7, (the maximum value of) the intensity of the reflected beam as indicated by solid-line graph 50 has a larger margin than that of dashed-line graph 48, with respect to first threshold L1, and thus it could be understood that the condition of the solid-line graph is better than the dashed-line graph.

As a means for changing the increase rate of the irradiating laser beam, various means may be used. For example, the movement velocity of processing head 32 relative to workpiece 18 as shown in FIG. 2, or the movement velocity of light condense optical system 16 relative to workpiece 18 as shown in FIG. 3, may be changed. Otherwise, the change rate of the curvature of the AO mirror as shown in FIG. 4 may be changed.

Figure 8:
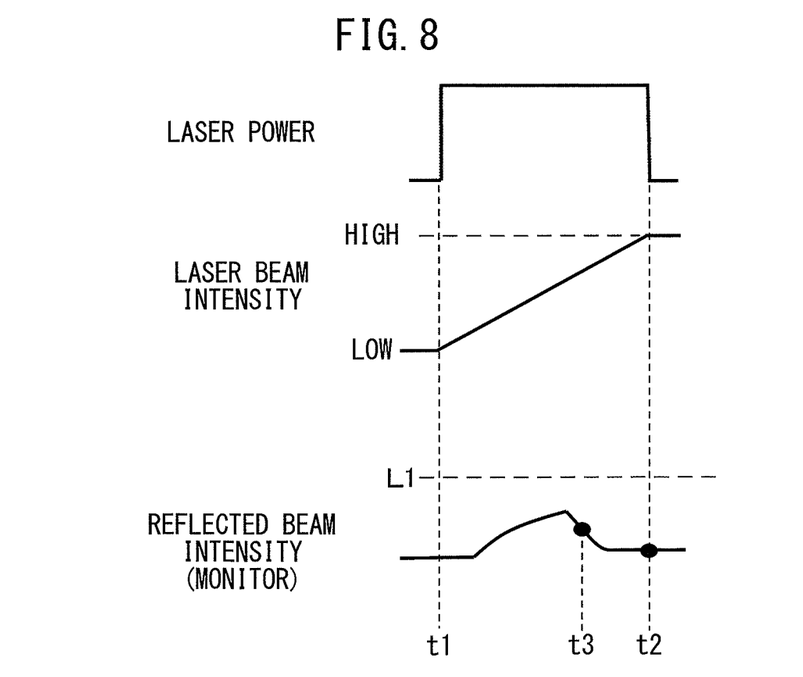
FIG. 8 is a graph, similar to FIG. 5, exemplifying that a period of time from when the intensity of the reflected beam turns downward to when the next process is started is set or changed.
Figure 9:
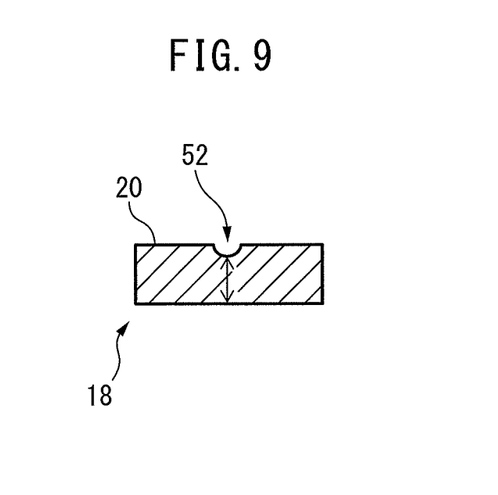
FIG. 9 shows an example in which a recess formed on a workpiece surface by laser irradiation has a relatively small depth.
Figure 10:
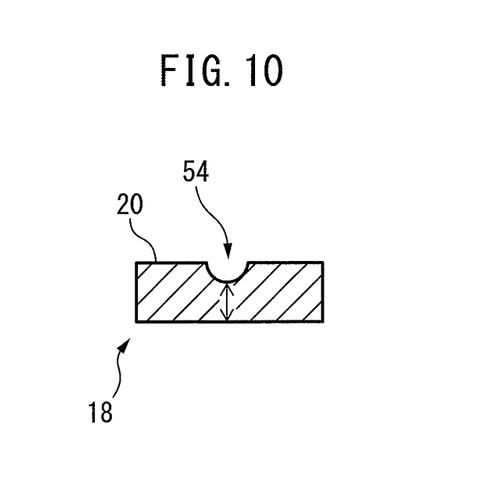
FIG. 10 shows an example in which a recess formed on a workpiece surface by laser irradiation has a relatively large depth.

FIG. 8 is a graph similar to FIG. 5, showing an example in which a period of time from when the intensity of the reflected beam turns downward to when the current process is transited to the next process is set or changed. For example, immediately after the intensity of the reflected beam turns downward (time point t3), a formed recess 52 has a relatively small depth, as shown in FIG. 9. Then, after the laser processing is carried out for a certain period of time (time point t2), a recess 54 having a relatively large depth is formed, as shown in FIG. 10. As such, by continuing the laser irradiation after the intensity the reflected beam turns downward, the depth of the recess formed on the workpiece surface can be adjusted. For example, in case that the next process is piercing, when the depth of the recess is relatively large, the piercing can be carried out at a low laser power and a processing time of the piercing can be reduced.

Figure 11:
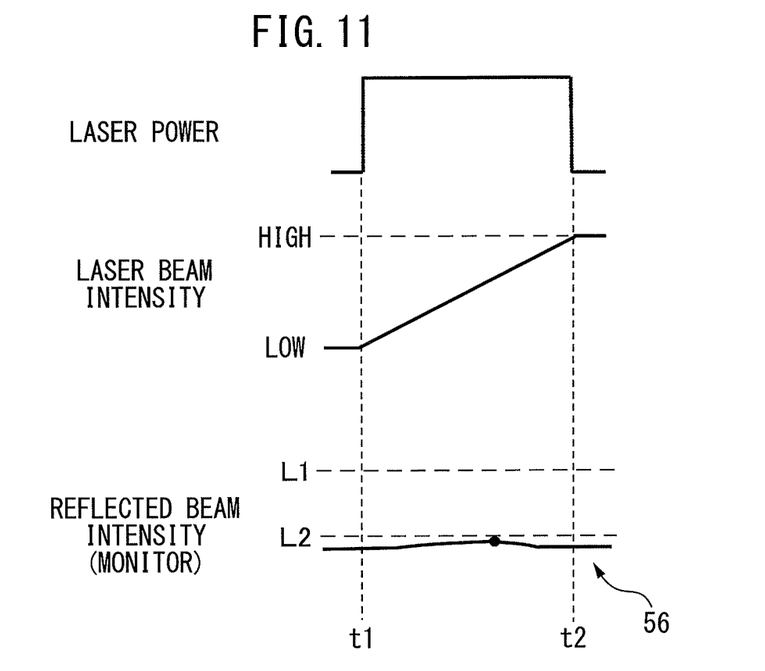
FIG. 11 is a graph, similar to FIG. 5, exemplifying that the laser irradiation can be continued even when it is not detected that the intensity of the reflected beam does not turn downward.

FIG. 11 is a graph similar to FIG. 5, showing an example in which the laser processing can be continued even if it is not detected that the intensity of the reflected beam turns downward. For example, when the workpiece is formed by a material having low reflectivity, it may be difficult to detect that the intensity of the reflected beam turns downward by the recess formed on the workpiece surface. Therefore, as indicated by a graph 56 in FIG. 11, a second threshold L2 lower than first threshold L1 may be predetermined. Then, when it is not detected that the intensity of the reflected beam turns downward, and when the intensity of the reflected beam does not reach second threshold L2 until a predetermined period of time (from t1 to t2) has passed, the current process can be transited to the next process.

As described above, when the intensity of the reflected beam does not exceeds the second threshold lower than the first threshold within the predetermined period of time, it is not likely that the laser oscillator, etc., is damaged due to the reflected beam even if the laser processing is continued. Therefore, even when it is not detected that the intensity of the reflected beam turns downward, the laser processing can be continued. In addition, the second threshold may be experimentally determined.

Figure 12:
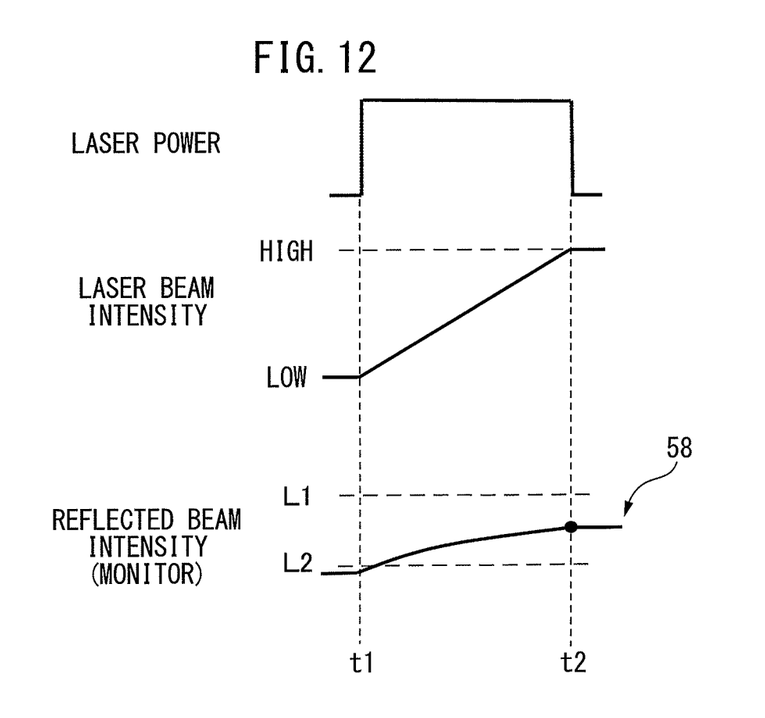
FIG. 12 is a graph, similar to FIG. 11, exemplifying that retry operation is executed as the next process when it is not detected that the intensity of the reflected beam does not turn downward.

FIG. 12 is a graph similar to FIG. 11, showing an example in which the current process is transited to a retry operation as the next process, when it is not detected that the intensity of the reflected beam turns downward. In the example of FIG. 12, as indicated by a graph 58, it is not detected that the intensity of the reflected beam turns downward within the predetermined period of time (from t1 to t2), and the peak of the intensity of the reflected beam is between first threshold L1 and second threshold L2 at time point t2. In such a case, it is preferable that the next process be the retry operation (in which an operation for gradually increasing the intensity of the irradiating laser beam within the predetermined period of time is repeated), which is different from the suspending the laser processing (when the intensity of the reflected beam exceeds the first threshold as shown in FIG. 6) or the continuing the laser processing (when the intensity of the reflected beam does not exceed the second threshold as shown in FIG. 11). By executing the retry operation, the probability that the recess is formed on the workpiece surface (or the intensity of the reflected beam turns downward) within the predetermined period of time is increased, resulting in that the current process can be transited to the continuing the laser processing, as shown in FIG. 5. Further, in the example of FIG. 12, it can be avoided that the excess reflected beam reenters the laser oscillator, etc. in the next process, without forming the recess on the workpiece surface.

Figure 13:
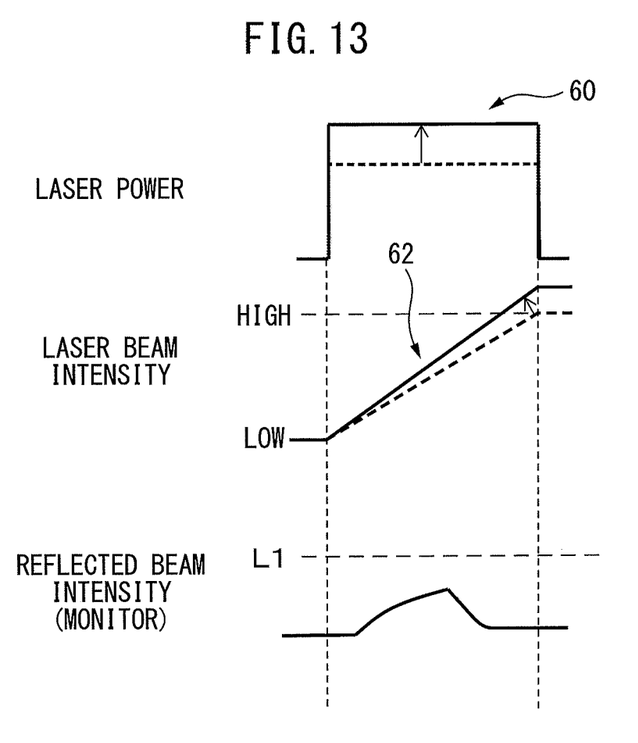
FIG. 13 shows an example of the retry operation, in which a laser power is changed larger than that of previous time.
Figure 14:
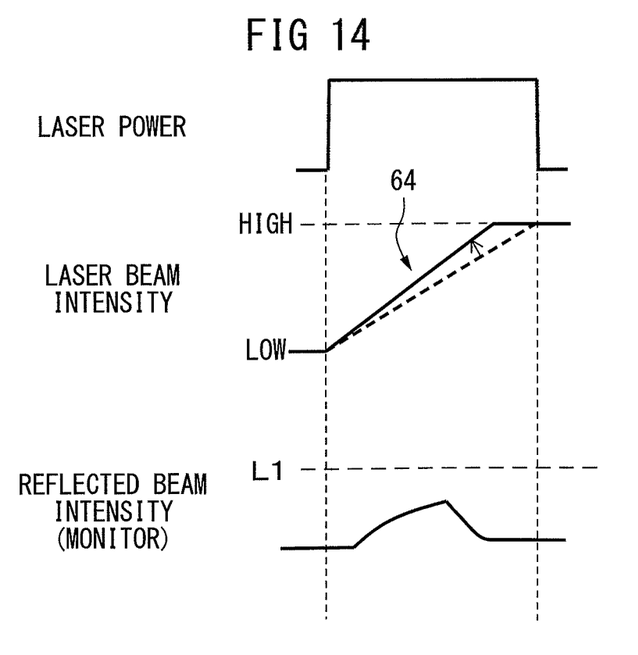
FIG. 14 shows an example of the retry operation, in which the increase rate of the intensity of the laser beam is changed larger than that of previous time.

FIGS. 13 and 14 show graphs each explaining a preferred example of the retry operation with respect to FIG. 12. The retry operation may be executed in the same condition as the previous operation (e.g., the increase rate of the laser beam irradiated onto the workpiece surface is the same). However, as shown by graph 60 in FIG. 13, the retry operation may be executed at a higher laser power than the previous operation. In this case, the intensity of the laser beam is varied as exemplified by graph 62. Otherwise, as shown by graph 64 in FIG. 14, the retry operation may be executed at a higher increase rate of the intensity of the laser beam than the previous operation.

In the laser processing, the intensity of the reflected beam is significantly fluctuated depending on the surface condition, etc. of the workpiece, and thus it may be difficult to specify the processing condition. In such a case, as shown in FIG. 13 or 14, by executing the retry operation while changing the condition (e.g., by increasing the laser power or the increase rate of the intensity of the laser beam), the recess can be assuredly formed without depending on the surface condition of the workpiece.

In the working examples as shown in FIGS. 5 to 14, the period of time between time points t1 and t2 is generally equal to 1 to 10 seconds, preferably, 3 to 5 seconds, depending on the processing condition. The (predetermined) period of time for gradually increasing the intensity of the irradiating laser beam may be set so that an (arithmetic) processing for selecting or determining the proper content of the next process can be executed within the period of time, corresponding to each pattern of the temporal change in the intensity of the laser beam (e.g., in which the intensity of the reflected beam turns downward or exceeds the first threshold).

Figure 15:
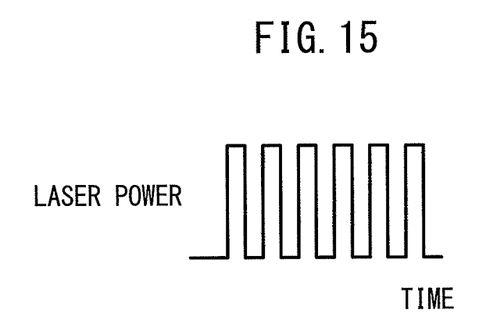
FIG. 15 shows an example in which the laser power represents a pulse waveform.

Further, in the working examples as shown in FIGS. 5 to 14, it is preferable that the laser power (in the upper graph) output from the laser oscillator be maintained constant during the intensity of the laser beam (in the middle graph) is increased. In one method for limiting the reflected beam, the laser processing is started at a low laser power, and then the laser power is gradually increased. However, in the working example, since the laser power may be constant, a complex laser power control is not necessary. In this regard, the expression "maintain(ed) constant" may include not only a case in which the laser power represents a continuous waveform (CW) as exemplified in FIGS. 5 to 14, but also a case in which the laser power represents a pulse waveform having a constant power, as exemplified in FIG. 15.

In the working examples according to the present invention, the intensity of the reflected beam is detected (or monitored) while gradually increasing the intensity of the irradiating laser beam, and the content of the next process is selected and executed based on the pattern of change in the monitored intensity of the reflected beam. For example, when the intensity of the reflected beam turns downward, it can be judged that the recess is formed on the workpiece surface. Since the laser beam is easily to be absorbed by the workpiece surface after the recess is formed, the reflected beam can be reduced in the laser processing in the next process. Further, even when the reflected beam is increased without forming the recess on the workpiece surface, the laser oscillator can be stopped before the excess reflected beam is generated, by setting the threshold with respect to the reflected beam.

In the laser processing device according to the above working example, the series of processes (in which the intensity of the reflected beam is detected (or monitored) while gradually increasing the intensity of the irradiating laser beam, and the content of the next process is selected and executed based on the temporal change in the detected intensity of the reflected beam) can be automatically executed. Therefore, the adverse effect due to the excess reflected beam can be eliminated and the laser processing can be efficiently started, without depending on the skill of the operator.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A laser processing device for carrying out laser processing of an object to be processed by condensing a laser beam by a light condense optical lens and irradiating the laser beam onto the object, the laser processing device comprising:
   a reflected beam intensity sensor configured to detect an intensity of a reflected beam, which is a part of a laser beam irradiated from a laser oscillator via a laser optical system and then is reflected by a surface of the object so as to return to the laser oscillator or the laser optical system;
   a light condense optical lens configured to condense the laser beam irradiated from the laser oscillator;
   a processor configured to:
      execute a process for forming a recess on the surface of the object by continuously increasing an intensity of the laser beam irradiated onto the surface of the object, over a predetermined period of time;
      monitor a temporal change in the intensity of the reflected beam detected by the reflected beam intensity sensor over the predetermined period of time;
      in response to the monitored temporal change in the intensity of the reflected beam indicating that the intensity of the reflected beam is increasing and is less than an intensity threshold, continue to increase the intensity of the laser beam;
      in response to the monitored temporal change in the intensity of the reflected beam indicating that the intensity of the reflected beam is decreasing and is less than the intensity threshold, execute a next process by irradiating the laser beam at a next intensity without gradually increasing the laser beam to the next intensity, the next process including at least one of a piercing process, a cutting process, a welding process or a marking process of the object, wherein the marking process forms a feature representing a character or a logotype on the surface of the object; and
      in response to the monitored temporal change in the intensity of the reflected beam indicating that the intensity of the reflected beam is greater than or equal to the intensity threshold, execute a stop process by stopping the irradiation of the laser beam and preventing execution of the next process.

2. The laser processing device as set forth in claim 1, wherein the processor is further configured to change a distance between a light condensing point of the light condense optical lens and the object.

3. The laser processing device as set forth in claim 1, wherein the processor is further configured to change a beam diameter of the laser beam entering the light condense optical lens.

4. The laser processing device as set forth in claim 1, wherein the content of the next process selected by the processor includes one of: continuing the laser processing in which the laser processing is carried out after a recess is formed on the surface of the object by irradiating the laser beam onto the surface; stopping the laser irradiation or suspending a processing program; and executing retry operation in which an operation for gradually increasing the intensity of the irradiating laser beam within a predetermined period of time is repeated in order to form a recess on the surface of the object.

5. The laser processing device as set forth in claim 1, further comprising a means for setting an increase rate of the intensity of the laser beam irradiated onto the surface of the object.

6. The laser processing device as set forth in claim 1, further comprising a means for changing a period of time from when the intensity of the reflected beam turns downward to when a current process is transited to the next process selected by the processor.

7. The laser processing device as set forth in claim 4, wherein the processor is configured to select continuing the laser processing as the next process, when the intensity of the reflected beam turns downward within the predetermined period of time.

8. The laser processing device as set forth in claim 4, wherein the processor is configured to select stopping the laser irradiation or suspending the processing program as the next process, when the intensity of the reflected beam exceeds a predetermined first threshold.

9. The laser processing device as set forth in claim 4, wherein the processor is configured to select continuing the laser processing as the next process, when the intensity of the reflected beam does not turn downward and does not reach a second threshold lower than a predetermined first threshold within the predetermined period of time.

10. The laser processing device as set forth in claim 4, wherein the processor is configured to select executing the retry operation as the next process, when the intensity of the reflected beam does not turn downward and when the intensity of the reflected beam is lower than a predetermined first threshold and higher than a second threshold lower than the first threshold after the predetermined period of time has elapsed.

11. The laser processing device as set forth in claim 4, wherein the content of the next process selected by the processor includes executing the retry operation, the retry operation is executed after a laser power is increased or after an increase rate of the intensity of the laser beam is increased.

12. The laser processing device as set forth in claim 1, wherein a laser power which is output from the laser oscillator is maintained constant, during the intensity of the laser beam irradiated onto the surface of the object is increased.

* * * * *